(12) United States Patent
Fang et al.

(10) Patent No.: US 12,491,221 B2
(45) Date of Patent: Dec. 9, 2025

(54) *LACTOBACILLUS CASEI* PRODUCING SHORT-CHAIN FATTY ACIDS, CULTIVATION METHOD THEREFOR AND APPLICATION THEREOF

(71) Applicant: WECARE PROBIOTICS CO., LTD., Jiangsu (CN)

(72) Inventors: Shuguang Fang, Jiangsu (CN); Tao Yan, Jiangsu (CN); Keke Chen, Jiangsu (CN); Jianguo Zhu, Jiangsu (CN); Shengpeng Feng, Jiangsu (CN); Peiyan Hao, Jiangsu (CN)

(73) Assignee: WECARE PROBIOTICS CO., LTD., Jiangsu (CN)

( * ) Notice: Subject to any disclaimer, the term of this patent is extended or adjusted under 35 U.S.C. 154(b) by 758 days.

(21) Appl. No.: 17/769,330

(22) PCT Filed: Jul. 1, 2020

(86) PCT No.: PCT/CN2020/099731
§ 371 (c)(1),
(2) Date: Apr. 14, 2022

(87) PCT Pub. No.: WO2021/082502
PCT Pub. Date: May 6, 2021

(65) Prior Publication Data
US 2023/0241132 A1 Aug. 3, 2023

(30) Foreign Application Priority Data
Oct. 31, 2019 (CN) .......................... 201911054563.8

(51) Int. Cl.
| | | |
|---|---|---|
| *A61K 35/747* | (2015.01) | |
| *A61K 9/00* | (2006.01) | |
| *A61K 9/14* | (2006.01) | |
| *A61P 1/00* | (2006.01) | |
| *C12N 1/20* | (2006.01) | |
| *C12P 7/52* | (2006.01) | |
| *C12P 7/54* | (2006.01) | |
| *C12R 1/245* | (2006.01) | |

(52) U.S. Cl.
CPC .......... *A61K 35/747* (2013.01); *A61K 9/0053* (2013.01); *A61K 9/14* (2013.01); *A61P 1/00* (2018.01); *C12N 1/205* (2021.05); *C12P 7/52* (2013.01); *C12P 7/54* (2013.01); *C12R 2001/245* (2021.05)

(58) Field of Classification Search
None
See application file for complete search history.

(56) References Cited

FOREIGN PATENT DOCUMENTS

| | | | |
|---|---|---|---|
| CN | 102325464 A | 1/2012 | |
| CN | 103053904 A | 4/2013 | |
| CN | 105916513 A | 8/2016 | |
| CN | 1100897 | * 6/2019 | .......... A23L 33/135 |
| CN | 110089756 A | * 8/2019 | .......... A23L 33/135 |
| CN | 110669697 A | 1/2020 | |
| WO | WO 03/010299 A1 | 2/2003 | |
| WO | WO 2014/195741 A1 | 12/2014 | |
| WO | WO 2019/046646 A1 | 3/2019 | |

OTHER PUBLICATIONS

Zhao et al., "Feeding Lactobacillus plantarum and Lactobacillus casei increased microbial diversity and short chain fatty acids production in the gut-intestinal tract of weaning piglets" Acta Microbiologica Sinica, 2016, 56(8): 1291-1300.
Wang et al., "Survival of Lactobacillus casei strain Shirota in the intestines of healthy Chinese adults" Microbiol Immunol 2015; 59: 268-276.
International Search Report dated Sep. 29, 2020, International Application No. PCT/CN2020/099731, 10 pages.
Database Medline [Online], US National Library of Medicine (NLM), Bethesda, MD, US; Aug. 4, 2016 (Aug. 4, 2016), Zhao Xiuying et al: "[Feeding Lactobacillus plantarum and Lactobacillus casei increased microbial diversity and short chain fatty acids production in the gut-intestinal tract of weaning piglets].", Database accession No. NLM29738199.
Qu et al: "Antidiabetic Effects of Lactobacillus casei Fermented Yogurt through Reshaping Gut Microbiota Structure in Type 2 Diabetic Rats", Journal of Agricultural and Food Chemistry, vol. 66, No. 48, Dec. 5, 2018 (Dec. 5, 2018), pp. 12696-12705.

* cited by examiner

*Primary Examiner* — Jana A Hines
*Assistant Examiner* — Khatol S Shahnan Shah
(74) *Attorney, Agent, or Firm* — KDW FIRM PLLC

(57) ABSTRACT

Provided is a *Lactobacillus casei* producing short-chain fatty acids in a high yield, a culture method therefor and an application thereof. *Lactobacillus casei* LC89 capable of producing short-chain fatty acids in a high yield is preserved in the China General Microbiological Culture Collection Center on 5 Mar. 2018, with the accession number of CGMCC NO. 15409 and a classification name of *Lactobacillus casei*. Provided is a *Lactobacillus casei* producing short-chain fatty acids in a high yield, which is superior to the commercial strain, *Lactobacillus rhamnosus* GG (LGG). Also provided are a cultivation method therefor and an application thereof in the treatment of host inflammatory bowel diseases to achieve functions of supplementing probiotics to regulate the intestinal tract and alleviating host inflammatory bowel diseases.

5 Claims, No Drawings
Specification includes a Sequence Listing.

SEQUENCE LISTING

```
<160> NUMBER OF SEQ ID NOS: 1

<210> SEQ ID NO 1
<211> LENGTH: 1498
<212> TYPE: DNA
<213> ORGANISM: Lactobacillus casei

<400> SEQUENCE: 1
tcaggatgaa cgctggcggc gtgcctaata catgcaagtc gaacgagttt tggtcgatga      60
acggtgcttg cactgagatt cgacttaaaa cgagtggcgg acgggtgagt aacacgtggg     120
taacctgccc ttaagtgggg gataacattt ggaaacagat gctaataccg cataaatcca     180
agaaccgcat ggttcttggc tgaaagatgg cgcaagctat cgcttttgga tggacccgcg     240
gcgtattagc tagttggtga ggtaacggct caccaaggcg atgatacgta gccgaactga     300
gaggttgatc ggccacattg ggactgagac acggcccaaa ctcctacggg aggcagcagt     360
agggaatctt ccacaatgga cgcaagtctg atggagcaac gccgcgtgag tgaagaaggc     420
tttcgggtcg taaaactctg ttgttggaga agaatggtcg gcagagtaac tgttgtcggc     480
gtgacggtat ccaaccagaa agccacggct aactacgtgc cagcagccgc ggtaatacgt     540
aggtggcaag cgttatccgg atttattggg cgtaaagcga cgcaggcgg ttttttaagt     600 ctgatgtgaa agccctcggc ttaaccgagg aagcgcatcg gaaactggga aacttgagtg     660
cagaagagga cagtggaact ccatgtgtag cggtgaaatg cgtagatata tggaagaaca     720
ccagtggcga aggcggctgt ctggtctgta actgacgctg aggctcgaaa gcatgggtag     780
cgaacaggat tagataccct ggtagtccat gccgtaaacg atgaatgcta ggtgttggag     840
```

-continued

```
ggtttccgcc cttcagtgcc gcagctaacg cattaagcat tccgcctggg gagtacgacc    900
gcaaggttga aactcaaagg aattgacggg ggcccgcaca agcggtggag catgtggttt    960
aattcgaagc aacgcgaaga accttaccag gtcttgacat cttttgatca cctgagagat   1020
caggtttccc cttcgggggc aaaatgacag gtggtgcatg gttgtcgtca gctcgtgtcg   1080
tgagatgttg ggttaagtcc cgcaacgagc gcaaccctta tgactagttg ccagcattga   1140
gttgggcact ctagtaagac tgccggtgac aaaccggagg aaggtgggga tgacgtcaaa   1200
tcatcatgcc ccttatgacc tgggctacac acgtgctaca atggatggta caacgagttg   1260
cgagaccgcg aggtcaagct aatctcttaa agccattctc agttcggact gtaggctgca   1320
actcgcctac acgaagtcgg aatcgctagt aatcgcggat cagcacgccg cggtgaatac   1380
gttcccgggc cttgtacaca ccgcccgtca caccatgaga gtttgtaaca cccgaagccg   1440
gtggcgtaac ccttttaggg agcgagccgt ctaaggtggg acaaatgatt agggtgaa    1498
```

LACTOBACILLUS CASEI PRODUCING SHORT-CHAIN FATTY ACIDS, CULTIVATION METHOD THEREFOR AND APPLICATION THEREOF

TECHNICAL FIELD

The present application relates to the field of microorganisms, and in particular, to a *Lactobacillus casei* producing short-chain fatty acids in a high yield, a cultivation method therefor and use thereof.

BACKGROUND

Inflammatory bowel disease, referred to as IBD for short, is a special chronic intestinal inflammatory disease, and the "chronic enteritis" commonly known to many people is probably the IBD. The incidence rate of the IBD in China has been increasingly rising in the past 30 years. According to literature reports from China, the number of cases in the recent five years has reached eight times that of the corresponding period in the 1990s. IBD has gradually become a common digestive disease in China. Patients suffering from IBD can't absorb carbohydrates, proteins, fats, vitamins and various trace elements normally from food, and in addition, the intestinal inflammation or drugs taken may cause poor appetite, so IBD is often accompanied by abdominal pain, diarrhea, malnutrition and emaciation to varying degrees. Such a disease even affects the normal growth and development of adolescents and children.

Probiotics, often defined as live microbial feed supplements which beneficially affect the human or animal hosts by improving the intestinal microbial balance, play an important role in the regulation of the intestinal tract of hosts. The regulatory function of probiotics mainly lies in the beneficial metabolites produced during its growth, which have corresponding health effects on the host.

Short-chain fatty acids (SCFAs), also known as volatile fatty acids, are organic fatty acids composed of 1-6 carbon atoms, mainly including acetic acid, propionic acid, butyric acid and the like. SCFA is mainly derived from the fermentation of carbohydrates by anaerobic bacteria in the colon and can directly provide energy for the intestinal mucosal cells. In recent years, studies have shown that short-chain fatty acids can also regulate the pH in the intestinal tract and alleviate inflammatory bowel diseases. However, because the number of short-chain fatty acids produced by different strains is different, the strains producing short-chain fatty acids in a high yield have become the object attracting the researchers' attention.

SUMMARY

The present application provides a *Lactobacillus casei* producing short-chain fatty acids in a high yield, and also provides a cultivation method therefor and use thereof in the treatment of host inflammatory bowel diseases. The *Lactobacillus casei* provided by the present application can achieve functions of supplementing probiotics to regulate the intestinal tract and alleviating inflammatory bowel diseases of hosts.

A first aspect of the present application provides a *Lactobacillus casei* producing short-chain fatty acids in a high yield, which is named LC89 and deposited in the China General Microbiological Culture Collection Center whose address is No. 3, No. 1 Courtyard, West Beichen Road, Chaoyang District, Institute of Microbiology Chinese Academy of Sciences, Beijing, China, with the deposit number of CGMCC No. 15409 and a classification name of *Lactobacillus casei*.

Further, the short-chain fatty acid is any one or a combination of at least two of acetic acid, propionic acid, butyric acid, valeric acid and caproic acid.

A second aspect of the present application provides a cultivation method for the *Lactobacillus casei* producing short-chain fatty acids in a high yield, which includes steps of: inoculating a *Lactobacillus casei* LC89 strain into a culture medium suitable for producing short-chain fatty acids, culturing the *Lactobacillus casei* LC89 strain for 8-24 hours with the temperature controlled to be 25° C.-45° C. and pH to be 5.0-7.0, and finally obtaining a culture solution.

Further, the content of short-chain fatty acids in the culture solution is detected by a liquid chromatograph.

Further, the culture medium includes the following components by weight percentage: 2.0%-10% glucose, 0.5%-5% beef extract powder, 0.8%-4.5% peptone, 0.5%-6.0% yeast extract paste, 0.2%-2.0% sodium acetate, 0.02%-0.15% magnesium sulfate, 0.01%-0.5% manganese sulfate, 0.1%-0.9% calcium chloride, 0.1%-0.9% diammonium hydrogen citrate, 0.05%-0.5% Tween-80 and 0.1%-1.0% dipotassium hydrogen phosphate, with the remaining being water, and the culture medium is sterilized at 121° C. for 20 minutes.

Further, the glucose in the culture medium is sterilized alone, the other components are sterilized together, and then all components are mixed in an aseptic operation.

A third aspect of the present application provides use of *Lactobacillus casei* LC89 highly producing short-chain fatty acids in the treatment of inflammatory bowel diseases.

A fourth aspect of the present application provides a product for the treatment of inflammatory bowel diseases, which includes the *Lactobacillus casei* LC89.

Further, the product is in the form of an oral powder.

Further, the powder is obtained by subjecting the *Lactobacillus casei* LC89 producing short-chain fatty acids in a high yield to vacuum freeze-drying or spray drying.

Further, the powder further includes an adjuvant.

Further, the adjuvant is inulin.

Further, the *Lactobacillus casei* LC89 is a live bacterial powder or a dead bacterial powder.

With the above solutions, the present application has at least the following advantages: the lactic acid bacteria provided by the present application can produce short-chain fatty acids in a high yield which is higher than the yield of the commonly used *Lactobacillus* and the commercial strain *Lactobacillus rhamnosus* GG (LGG); proved by animal tests and human tests, the lactic acid bacteria preparation can effectively alleviate the inflammatory bowel disease of the host and relieve the symptoms such as abdominal pain, diarrhea and loss of appetite caused by the inflammatory bowel disease; and since the *Lactobacillus casei* belongs to probiotics, the short-chain fatty acids produced by the fermentation of the *Lactobacillus casei* are completely harmless or even beneficial to the human body and have excellent safety.

The above description is merely an overview of the technical solutions of the present application. In order to better understand the technical means of the present application and implement the present application in accordance with the content of the description, the preferred embodiments of the present application are described in detail below.

DETAILED DESCRIPTION

Specific embodiments of the present application will be described in further detail below in connection with examples. The examples described below are intended to explain the present application but not to limit the scope of the present application.

It is to be noted that the experimental methods in the following examples are conventional methods unless otherwise specified; and the materials, reagents and the like used in the examples are commercially available unless otherwise specified. The quantitative tests in the following examples are all repeated three times and the results are averaged.

The formulation of the common reagent used in the present application is as follows, which will not be repeated in subsequent examples.

MRS culture medium: 10.00 g of peptone, 10.00 g of beef extract paste, 5.00 g of yeast extract paste, 2.00 g of diammonium hydrogen citrate, 20.00 g of glucose, 1 mL of Tween-80, 2.00 g of dipotassium hydrogen phosphate, 0.58 g of manganese sulfate and 0.28 g of magnesium sulfate were dissolved in 1 L of distilled water, with the pH value adjusted to 6.4.

EXAMPLE 1

Isolation, Screening And Identification Of Strains Producing Short-Chain Fatty Acids This example provided a method for isolating, screening and identifying strains producing short-chain fatty acids, which includes the following steps.

Several samples of traditional fermented food were dissolved in sterile water and subjected to gradient dilution, 1 mL of diluted samples in suitable gradients was taken into sterile culture dishes (each dilution gradient was made into three parallel dilution gradients), an MRS-calcium carbonate medium was poured in each dish, and after coagulation, the samples were cultured in an anaerobic environment in an inverse position at 37° C. for 72 hours. A total of 100 strains with calcium-dissolving zones (denoted in diameter of the calcium-dissolving zone, in mm) were selected, numbered 1-100, among which the number data of the top 20 strains with the larger calcium-dissolving zone were selected. The results are shown in Table 1.

TABLE 1

Status of top 20 strains having the larger calcium-dissolving zone

| Strain No. | Calcium-dissolving zone diameter (mm) |
| --- | --- |
| No. 1 | $2.60 \pm 0.04^{ab}$ |
| No. 3 | $2.87 \pm 0.07^{a}$ |
| No. 10 | $2.85 \pm 0.08^{a}$ |
| No. 17 | $2.94 \pm 0.03^{ab}$ |
| No. 25 | $2.90 \pm 0.06^{ab}$ |
| No. 38 | $2.65 \pm 0.05^{ab}$ |
| No. 49 | $2.67 \pm 0.08^{ab}$ |
| No. 68 | $2.71 \pm 0.02^{ab}$ |
| No. 70 | $2.80 \pm 0.05^{a}$ |
| No. 73 | $2.75 \pm 0.05^{a}$ |
| No. 75 | $2.77 \pm 0.05^{ab}$ |
| No. 79 | $2.88 \pm 0.03^{a}$ |
| No. 81 | $2.90 \pm 0.02^{ab}$ |
| No. 82 | $2.95 \pm 0.06^{ab}$ |
| No. 84 | $3.13 \pm 0.04^{ab}$ |
| No. 86 | $2.98 \pm 0.01^{ab}$ |
| No. 89 | $3.10 \pm 0.03^{ab}$ |
| No. 91 | $2.98 \pm 0.01^{ab}$ |
| No. 95 | $2.77 \pm 0.05^{ab}$ |
| No. 98 | $2.84 \pm 0.02^{a}$ |

Note:
there is significant difference in the data marked with different lowercase letters ($^{ab}$) (P < 0.05) while there is no significant difference in the data marked with one letter ($^{a}$) (P > 0.05).

EXAMPLE 2

Method for Fermenting and Detecting Strains Producing Short-Chain Fatty Acids in a High Yield This example provided a method for fermenting and detecting strains producing short-chain fatty acids in a high yield, which includes the following steps.

In S1, 20 strains with larger calcium-dissolving zones were each inoculated into a fermentation medium.

The culture medium included the following components by weight percentage: 2.0%-10% glucose, 0.5%-5% beef extract powder, 0.8%-4.5% peptone, 0.5%-6.0% yeast extract paste, 0.2%-2.0% sodium acetate, 0.02%-0.15% magnesium sulfate, 0.01%-0.5% manganese sulfate, 0.1%-0.9% calcium chloride, 0.1%-0.9% diammonium hydrogen citrate, 0.05%-0.5% Tween-80 and 0.1%-1.0% dipotassium hydrogen phosphate, with the remaining being water. The glucose in the culture medium was sterilized alone, the other components were sterilized together, and then all components were mixed in an aseptic operation. The sterilization conditions were: at 121° C. for 20 minutes.

1%-5% of the inoculation amount of the sterilized fermentation medium was inoculated and cultured in the conditions that the culture temperature was 25° C.-45° C., the pH was controlled to be 5.0-7.0, and the culture time was 8-24 hours to obtain the culture solution.

In S2, the cultured bacterial liquid was centrifuged at 6500 rpm for 20 minutes at 4° C., the obtained supernatant was filtered with a membrane with a pore diameter of 0.22 µm, the filtrate was diluted 10-fold with sterile water, and the short-chain fatty acids (acetic acid, propionic acid and butyric acid) in the supernatant was detected by a high performance liquid chromatograph.

The chromatographic conditions were as follows:

the instrument was Agilent 1100; the chromatographic column was C18, 46*250 mm, 50 cm; the mobile phase was methanol/$H_3PO_4$/water=5/0.05/95; the flow rate was 1 mL/min; the column temperature was 30° C., detected by UV of 210 nm; and the injection volume was 5 µL.

For the 20 strains numbered in Example 1, the supernatant of the top 10 strains with the larger inhibition zone was selected, and the short-chain fatty acids (acetic acid, propionic acid and butyric acid) were detected by the method described above. The results are shown in Table 2, and the results show that the yield of short-chain fatty acids of the strain No. 89 was the highest.

TABLE 2

Short-chain fatty acid yield of top 10 strains having the larger calcium-dissolving zone

| Strain No | Acetic acid (mmol/L) | Propionic acid (mmol/L) | Butyric acid (mmol/L) | Valeric acid (mmol/L) | Caproic acid (mmol/L) |
|---|---|---|---|---|---|
| No. 3  | 106.14 ± 0.48 $^{ab}$ | 3.47 ± 0.05 $^{a}$  | 12.15 ± 0.32 $^{ab}$ | 1.72 ± 0.03 $^{ab}$ | 0.31 ± 0.02 $^{ab}$ |
| No. 17 | 103.20 ± 0.17 $^{ab}$ | 2.17 ± 0.06 $^{ab}$ | 11.22 ± 0.21 $^{ab}$ | 1.67 ± 0.05 $^{ab}$ | 0.25 ± 0.03 $^{ab}$ |
| No. 25 | 98.31 ± 0.45 $^{ab}$  | 2.04 ± 0.04 $^{ab}$ | 9.04 ± 0.45 $^{ab}$  | 1.56 ± 0.03 $^{ab}$ | 0.22 ± 0.01 $^{ab}$ |
| No. 79 | 130.14 ± 0.25 $^{a}$  | 3.69 ± 0.02 $^{a}$  | 16.28 ± 0.53 $^{a}$  | 1.88 ± 0.05 $^{a}$  | 0.28 ± 0.02 $^{a}$  |
| No. 81 | 128.14 ± 0.25 $^{a}$  | 3.51 ± 0.02 $^{a}$  | 15.05 ± 0.12 $^{a}$  | 1.92 ± 0.04 $^{a}$  | 0.3 ± 0.01 $^{a}$   |
| No. 82 | 138.16 ± 0.32 $^{a}$  | 5.79 ± 0.02 $^{ab}$ | 18.05 ± 0.15 $^{ab}$ | 2.12 ± 0.05 $^{ab}$ | 0.34 ± 0.02 $^{ab}$ |
| No. 84 | 156.15 ± 0.45 $^{ab}$ | 4.67 ± 0.03 $^{ab}$ | 18.35 ± 0.22 $^{ab}$ | 2.32 ± 0.02 $^{ab}$ | 0.4 ± 0.05 $^{ab}$  |
| No. 86 | 168.13 ± 0.35 $^{ab}$ | 5.68 ± 0.05 $^{ab}$ | 21.15 ± 0.25 $^{ab}$ | 2.82 ± 0.01 $^{ab}$ | 1.0 ± 0.02 $^{ab}$  |
| No. 89 | 193.00 ± 0.15 $^{ab}$ | 7.85 ± 0.06 $^{ab}$ | 27.42 ± 0.43 $^{ab}$ | 3.12 ± 0.05 $^{ab}$ | 1.5 ± 0.03 $^{ab}$  |
| No. 91 | 133.16 ± 0.75 $^{ab}$ | 3.75 ± 0.09 $^{a}$  | 15.93 ± 0.22 $^{a}$  | 1.89 ± 0.02 $^{a}$  | 0.29 ± 0.02 $^{a}$  |

Note:
there is a significant difference in the data marked with different lowercase letters ($^{ab}$) ($P < 0.05$) while there is no significant difference in the data marked with one letter ($^{a}$) ($P > 0.05$).

A strain having a large calcium-dissolving zone and producing short-chain fatty acids in a high yield was isolated and named LC89. The strain was rod-shaped and short rod-shaped, was present in pairs or in chains under a microscope, and could ferment lactose and glucose to produce lactic acid, acetic acid, propionic acid, butyric acid and the like, which is an anaerobic gram-positive bacillus. The obtained strain was identified by 16s rDNA sequencing, and the sequencing results were shown in SEQ ID NO. 1. After Blast alignment with the type strain, the strain was identified as a *Lactobacillus casei* and named *Lactobacillus casei* LC89, which was deposited in the China General Microbiological Culture Collection Center whose address is No. 3, No. 1 Courtyard, West Beichen Road, Chaoyang District, Beijing, China, on Mar. 5, 2018, with the deposit number of CGMCC No. 15409.

The *Lactobacillus casei* LC89 has the following biological characteristics:
  a. bacteria characteristics: it is gram-positive bacteria, which grows well in an anaerobic environment with the pH of 4.5-7.5 and does not form spores; the bacteria are about (0.6-1.1) μm*(2.5-6.5) μm, arranged in pairs or in chains, without flagella;
  b. bacterial colony characteristics: the bacterial colony on the MRS medium is milky white and convex or lenticular, with a diameter of 0.2-2.5 mm and smooth surfaces, without mycelium;
  c. biological characteristics: the strain is a facultative anaerobe, but it grows best under anaerobic conditions; the optimum growth temperature is 35° C.-39° C., it grows well at 30° C.-36° C., and it does not grow basically below 15° C.; the optimum initial pH is 6.5-7.5; and it grows well in the medium containing glucose, lactose and sucrose.

With other commonly used probiotics (*Lactobacillus rhamnosus*, *Lactobacillus plantarum*, *Lactobacillus acidophilus*, *Bifidobacterium longum*, *Bifidobacterium brevis*, *Bifidobacterium infantis*, *Bifidobacterium adolescentis*, *Bifidobacterium bifidum*, *Bifidobacterium lactis*, etc.) and commercial strain *Lactobacillus rhamnosus* GG (LGG) as the comparison, the content of short-chain fatty acids (acetic acid, propionic acid and butyric acid) in the fermentation supernatant of *Lactobacillus casei* LC89 was detected using the same cultivation method and detection method.

*Lactobacillus rhamnosus* GG (LGG) was isolated from the healthy human body by two American professors (Gorbach and Goldin) from North Carolina State University in 1983. It has outstanding performance in resistance to gastric acid and bile, can enter the human intestinal tract for colonization and maintain activity, and has the functions of balancing and improving the gastrointestinal function, enhancing human autoimmunity, preventing and helping with diarrhea treatment, so it has become the third generation probiotics which is the most studied in the world.

The yield comparison results are shown in Table 3 below, and the results show that the yield of short-chain fatty acids of *Lactobacillus casei* LC89 is higher than that of other conventional probiotics and commercial strain *Lactobacillus rhamnosus* GG (LGG).

TABLE 3

Comparison of short-chain fatty acid yield between *Lactobacillus casei* LC89 and other commonly used probiotics

| Strain | Acetic acid (mmol/L) | Propionic acid (mmol/L) | Butyric acid (mmol/L) | Valeric acid (mmol/L) | Caproic acid (mmol/L) |
|---|---|---|---|---|---|
| *Lactobacillus rhamnosus*    | 104.12 ± 0.79 $^{a}$  | 3.25 ± 0.02 $^{a}$  | 15.12 ± 0.15 $^{a}$  | 1.72 ± 0.03 $^{a}$  | 0.35 ± 0.02 $^{a}$  |
| *Lactobacillus plantarum*    | 125.12 ± 0.57 $^{ab}$ | 5.37 ± 0.03 $^{ab}$ | 20.12 ± 0.22 $^{ab}$ | 1.87 ± 0.02 $^{ab}$ | 0.28 ± 0.01 $^{ab}$ |
| *Lactobacillus acidophilus*  | 106.32 ± 0,67 $^{a}$  | 3.35 ± 0.01 $^{a}$  | 15.35 ± 0.23 $^{a}$  | 1.73 ± 0.04 $^{a}$  | 0.34 ± 0.02 $^{a}$  |
| *Lactobacillus casei* LC89   | 195.00 ± 0.14 $^{ab}$ | 7.97 ± 0.07 $^{ab}$ | 26.92 ± 0.23 $^{ab}$ | 3.01 ± 0.05 $^{ab}$ | 1.48 ± 0.03 $^{ab}$ |
| *Bifidobacterium longum*     | 88.51 ± 0.42 $^{ab}$  | 2.05 ± 0.01 $^{ab}$ | 8.05 ± 0.25 $^{ab}$  | 1.33 ± 0.03 $^{ab}$ | 0.18 ± 0.04 $^{ab}$ |
| *Bifidobacterium brevis*     | 80.11 ± 0.47 $^{ab}$  | 1.55 ± 0.03 $^{ab}$ | 7.55 ± 0.27 $^{ab}$  | 1.26 ± 0.02 $^{ab}$ | 0.14 ± 0.02 $^{ab}$ |

TABLE 3-continued

Comparison of short-chain fatty acid yield between *Lactobacillus casei* LC89 and other commonly used probiotics

| Strain | Acetic acid (mmol/L) | Propionic acid (mmol/L) | Butyric acid (mmol/L) | Valeric acid (mmol/L) | Caproic acid (mmol/L) |
|---|---|---|---|---|---|
| *Bifidobacterium infantis* | 70.31 ± 0.39 $^{ab}$ | 1.01 ± 0.01 $^{ab}$ | 6.05 ± 0.21 $^{ab}$ | 1.19 ± 0.03 $^{ab}$ | 0.1 ± 0.03 $^{ab}$ |
| *Bifidobacterium adolescentis* | 50.48 ± 0.88 $^{ab}$ | 2.35 ± 0.02 $^{ab}$ | 4.35 ± 0.26 $^{ab}$ | 0.88 ± 0.01 $^{ab}$ | 0.08 ± 0.01 $^{ab}$ |
| *Bifidobacterium bifidum* | 55.50 ± 0.49 $^{ab}$ | 1.31 ± 0.03 $^{ab}$ | 2.32 ± 0.36 $^{ab}$ | 0.98 ± 0.02 $^{ab}$ | 0.11 ± 0.02 $^{ab}$ |
| *Bifidobacterium lactis* | 101.12 ± 0.468 | 3.45 ± 0.03 $^{a}$ | 15.01 ± 0.35 $^{a}$ | 1.69 ± 0.02 $^{a}$ | 0.30 ± 0.02 $^{a}$ |
| *Lactobacillus helveticus* | 70.34 ± 0.36 $^{ab}$ | 0.75 ± 0.02 $^{ab}$ | 8.98 ± 0.32 $^{ab}$ | 1.18 ± 0.03 $^{ab}$ | 0.13 ± 0.02 $^{ab}$ |
| *Lactobacillus reuteri* | 85.54 ± 0.47 $^{ab}$ | 0.78 ± 0.04 $^{ab}$ | 9.48 ± 0.52 $^{ab}$ | 1.25 ± 0.01 $^{ab}$ | 0.12 ± 0.03 $^{ab}$ |
| *Lactobacillus rhamnosus* GG (LGG) | 145.00 ± 0.24 $^{ab}$ | 4.57 ± 0.08 $^{ab}$ | 19.92 ± 0.25 $^{ab}$ | 2.51 ± 0.02 $^{ab}$ | 0.78 ± 0.03 $^{ab}$ |

Note:
there is a significant difference in the data marked with different lowercase letters ($^{ab}$) (P < 0.05) while there is no significant difference in the data marked with one letter ($^{a}$) (P > 0.05).

EXAMPLE 3

Preparation of *Lactobacillus casei* LC89 Product

The fermented liquor obtained after fermentation in Example 2 was centrifuged at 6500 rpm for 20 minutes to obtain a bacterial sludge, the bacterial sludge was mixed with a protective agent (10%-25% trehalose, 1%-5% sucrose and 10%-15% maltodextrin) in a ratio of 1:1-3, emulsified, vacuum freeze-dried or spray-dried and crushed, and a corresponding adjuvant (inulin) was added, to obtain *Lactobacillus casei* LC89 producing short-chain fatty acids in a high yield.

EXAMPLE 4

Use of *Lactobacillus casei* LC89 Producing Short-Chain Fatty Acids in a High Yield in the Treatment of Inflammatory Bowel Diseases The rat model of colitis was established, and rats which were not used to make the model were used as the normal control group, which drank water and ate food normally. The rats of colitis model were divided into a model control group (n=10), a high dose test group (diluting solid dispensing to $10^{10}$ CFU/ml, n=10) and a low dose test group (diluting solid dispensing to $10^{9}$ CFU/ml, n=10). Each group was given intragastric administration of corresponding preparation once a day for 21 days, in a dosage of 1 mL per 100 g of body weight. The results of colon lesions in rats are shown in Table 4 below. The histological scores of the rectum and lower segment of the colon of the test groups were lower than those of the model control group, which however were of no statistical significance; and the histological scores of middle and upper segment of the colon and the ulcerative colitis index of the test groups were lower than those of the model control group, with significant differences, indicating that *Lactobacillus casei* LC89 could promote the improvement of colon tissue to some extent.

EXAMPLE 4

Effect of *Lactobacillus casei* LC89 on Colonopathy

| | | Histological score | |
|---|---|---|---|
| Group | Ulcerative colitis index | Rectum + colon lower segment | Colon middle and upper segment |
| Normal control group | 0 | 0 | 1.2 ± 0.4 |
| Model control group | 27.6 ± 8.5 | 1.7 ± 0.4 | 3.2 ± 0.5 |
| High dose test group | 7.2 ± 4.5*** | 1.4 ± 0.3 | 1.3 ± 0.4*** |
| Low dose test group | 7.4 ± 2.5*** | 1.5 ± 0.5 | 1.5 ± 0.4* |

Comapred with the model control group, *p < 0.05, p < 0.01, and *p < 0.001

In addition, as shown in Table 5, the T cell transformation rate of the model control group was significantly lower than that of the normal control group (p<0.05), and the T cell transformation rate of the test groups was higher but was not significantly higher than that of the model control group. The serum IL-8 level of the model control group was significantly higher than that of the normal control group. The levels of IL-8 and TNF-α in serum of each treatment group were significantly lower than those of the model control group, indicating that *Lactobacillus casei* LC89 could effectively reduce inflammatory factors in rats and relieve inflammatory bowel disease.

TABLE 5

Effect of *Lactobacillus casei* LC89 on lymphocyte transformation rate and levels of IL-8 and TNF-α in serum

| Group | Lymphocyte transformation rate (SI) T cell | IL-8 level (pg/mL) | TNF-α level (pg/mL) |
|---|---|---|---|
| Normal control group | 1.01 ± 0.05 | 37.3 ± 3.5 | 18.5 ± 5.5 |
| Model control group | 0.57 ± 0.14 | 63.26 ± 3.2 | 75.5 ± 4.5 |

TABLE 5-continued

Effect of *Lactobacillus casei* LC89 on lymphocyte transformation rate and levels of IL-8 and TNF-α in serum

| Group | Lymphocyte transformation rate (SI) T cell | IL-8 level (pg/mL) | TNF-α level (pg/mL) |
|---|---|---|---|
| High dose test group | 0.66 ± 0.31 | 44 ± 3.5*** | 48.5 ± 6.9*** |
| Low dose test group | 0.62 ± 0.29 | 55 ± 5.5* | 58.5 ± 5.5* |

Comapred with the model control group, *p < 0.05, p < 0.01, and *p < 0.001

EXAMPLE 5

Volunteer Test

Volunteers were 50 people aged 30-50. The number of volunteers in the test group and the control group were both 25.

The *Lactobacillus casei* LC89 preparation in Example 3 was used. The test group was given *Lactobacillus casei* LC89 preparation with the viable bacteria count of $1\times10^9$-$1\times10^{10}$ CFU/g, the control group was given inulin instead of *Lactobacillus casei* LC89 preparation, and other conditions were the same.

Before the test began, the initial basic conditions of the subjects, such as the degree of abdominal pain caused by inflammatory bowel disease, the frequency of diarrhea, weight, etc., were acquired.

The subjects were given the *Lactobacillus casei* LC89 preparation once every morning and evening. After two weeks of use, the data of abdominal pain degree, diarrhea frequency and appetite were summarized. The results as shown in Table 6, and as can be seen from the test group given the *Lactobacillus casei* LC89 preparation, *Lactobacillus casei* LC89 could obviously ameliorate the degree of abdominal pain caused by inflammatory bowel disease, the frequency of diarrhea and the appetite.

TABLE 6

Volunteer test comparison

| | Control group | | Test group | |
|---|---|---|---|---|
| | Number of volunteers with alleviation (%) | Alleviation degree (%) | Number of volunteers with alleviation (%) | Alleviation degree (%) |
| Abdominal pain degree | 13 | 20 | 35 | 45 |
| Diarrhea frequency | 15 | 25 | 45 | 60 |
| Appetite | 5 | 15 | 30 | 35 |

The above are merely preferred examples of the present application and are not intended to limit the present application. It is to be noted that for those of ordinary skill in the art, a number of improvements and modifications may be made without departing from the technical principle of the present application, and these improvements and modifications shall be considered to fall within the scope of the present application.

What is claimed is:

1. A *Lactobacillus casei* producing short-chain fatty acids, named LC89 and deposited in the China General Microbiological Culture Collection Center, with the deposit number of CGMCC NO.15409; wherein the short-chain fatty acid is acetic acid, propionic acid, butyric acid, valeric acid and caproic acid; and wherein a yield of acetic acid is 195.00±0.14 mmol/L, a yield of propionic acid is 7.97±0.07 mmol/L, a yield of butyric acid is 26.92±0.23 mmol/L, a yield of valeric acid is 3.01±0.05 mmol/L, and a yield of caproic acid is 1.48±0.03 mmol/L.

2. A cultivation method for the *Lactobacillus casei* producing short-chain fatty acids according to claim 1, comprising steps of: inoculating a *Lactobacillus casei* LC89 strain into a culture medium suitable for producing short-chain fatty acids, incubating the *Lactobacillus casei* LC89 strain for 8-24 hours with the temperature controlled to be 25° C.-45° C. and pH to be 5.0-7.0, and finally obtaining a culture solution.

3. The cultivation method for the *Lactobacillus casei* producing short-chain fatty acids according to claim 2, wherein the content of short-chain fatty acids in the culture solution is detected by a liquid chromatograph.

4. The cultivation method for the *Lactobacillus casei* producing short-chain fatty acids according to claim 3, wherein the culture medium comprises the following components by weight percentage: 2.0%-10% glucose, 0.5%-5% beef extract powder, 0.8%-4.5% peptone, 0.5%-6.0% yeast extract paste, 0.2%-2.0% sodium acetate, 0.02%-0.15% magnesium sulfate, 0.01%-0.5% manganese sulfate, 0.1%-0.9% calcium chloride, 0.1%-0.9% diammonium hydrogen citrate, 0.05%-0.5% Tween-80 and 0.1%-1.0% dipotassium hydrogen phosphate, with the remaining being water, and the culture medium is sterilized at 121° C. for 20 minutes.

5. The cultivation method for the *Lactobacillus casei* producing short-chain fatty acids according to claim 4, wherein the glucose in the culture medium is sterilized alone, the other components are sterilized together, and then all components are mixed in an aseptic operation.

* * * * *